(No Model.)

F. HARDINGE.
WATCH MAKER'S POLISHER.

No. 438,415. Patented Oct. 14, 1890.

Witnesses.
Fred. Fetherstonhaugh.
H. G. McMillan.

Inventor:
Franklin Hardinge.
by Donald C. Ridout & Co
Attys

UNITED STATES PATENT OFFICE.

FRANKLIN HARDINGE, OF TORONTO, CANADA.

WATCH-MAKER'S POLISHER.

SPECIFICATION forming part of Letters Patent No. 438,415, dated October 14, 1890.

Application filed January 24, 1890. Serial No. 337,978. (No model.)

*To all whom it may concern:*

Be it known that I, FRANKLIN HARDINGE, of the city of Toronto, in the county of York, in the Province of Ontario, Canada, have invented a certain new and Improved Watch-Maker's Polisher, of which the following is a specification.

The object of the invention is to design a simple attachment for a watch-maker's lathe which will enable the polisher to be manipulated without any special care, so as to grind or polish pivots, legs of staffs, shoulders, the faces of pinions, and other parts of watchworks which require to be acted upon with absolute accuracy; and it consists, essentially, of a carriage movably connected to the bed of the lathe and having an arm extending behind the lathe at right angles to its length, the said arm having bearings designed to receive and support a spindle longitudinally and revolubly adjustable within its bearings, the end of the said spindle having connected to it a double-hinged clamp designed to hold the end of the polisher in such a manner that it may be brought against the surface to be polished with absolute accuracy, so that the most delicate polishing may be accomplished practically without special attention on the part of the operator, substantially as hereinafter more particularly explained.

Figure 1:
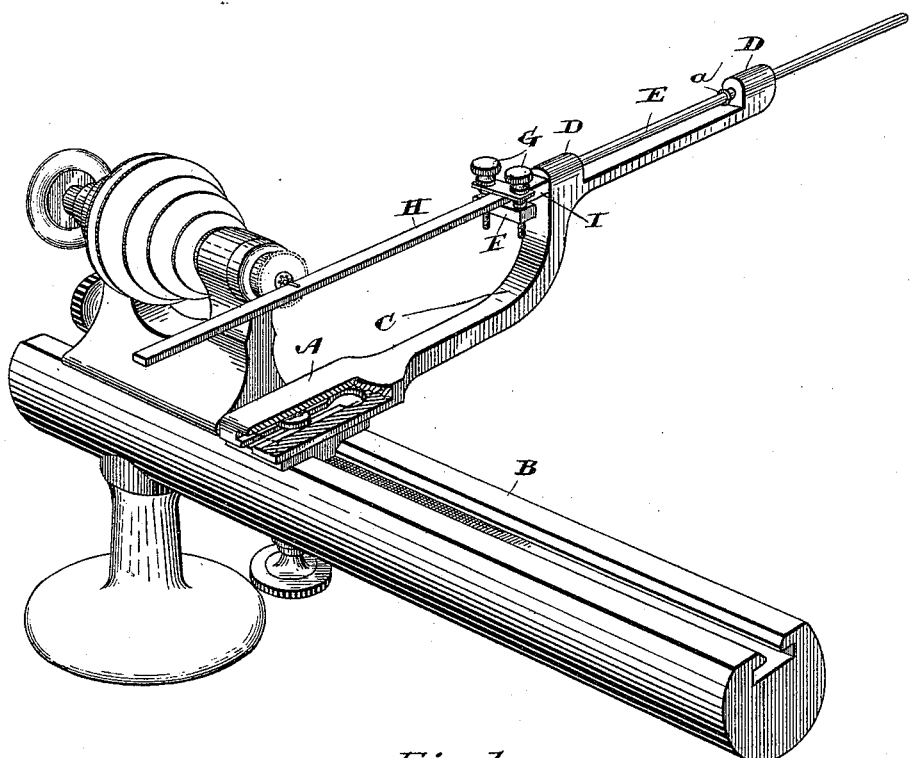
Figure 2:
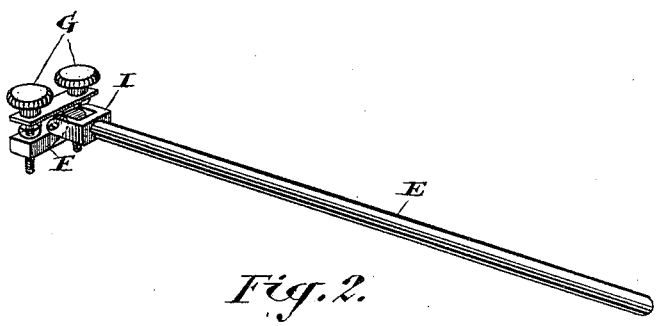

Figure 1 is a perspective view of a watchmaker's lathe with my polishing attachment in position. Fig. 2 is an enlarged detail of the clamp for connecting the polisher to its spindle.

In the drawings, A is the lathe-carriage, connected to the lathe-bed B in the ordinary way.

C is an arm extending from the carriage A and curved upwardly, so as to bring the bearings D formed on it near the plane of the center line of the lathe-spindle.

E is a spindle journaled in the bearings D, wherein it is held, so that it may be longitudinally adjusted as well as revolved, a collar $a$ being fixed to the spindle E between the bearings D.

F is a clamp provided with pinching-screws G and designed to grasp the polisher H, as shown. This clamp is hinged upon the head I, which is fixed upon the end of the spindle E, as shown. The operator has merely to adjust the carriage A so as to bring it close enough to the end of the lathe-spindle to permit the face of the polisher H to come in contact with the staff of the pinion or other article to be polished and then move said polisher H backward and forward until the desired polish has been given to the article. As the longitudinally-adjustable spindle E is held by its bearing at right angles to the center line of the lathe-spindle, it follows that the polisher H may be worked backward and forward with but little danger of any rocking movement against the surface being operated upon. Consequently the most delicate polishing may be performed with absolute accuracy and with but little attention or skill on the part of the operator.

What I claim as my invention is—

The herein-described polisher, comprising the carriage A, having the arm C extending at right angles from the bed and provided with bearings D, the spindle E, longitudinally and revolubly movable in said bearings D, the clamp F, hinged upon the end of the spindle E, and the polisher H, held in the clamp F, substantially as described.

Toronto, December 31, 1889.

FRANKLIN HARDINGE.

In presence of—
CHARLES C. BALDWIN,
W. G. MCMILLAN.